(12) United States Patent
Yoon et al.

(10) Patent No.: US 7,463,318 B2
(45) Date of Patent: Dec. 9, 2008

(54) REFLECTIVE-TRANSMISSIVE TYPE LIQUID CRYSTAL DISPLAY DEVICE AND METHOD FOR FABRICATING THE SAME

(75) Inventors: Joo Sun Yoon, Seoul (KR); Yong-Ho Yang, Seoul (KR)

(73) Assignee: Samsung Electronics Co., Ltd. (KR)

( * ) Notice: Subject to any disclaimer, the term of this patent is extended or adjusted under 35 U.S.C. 154(b) by 41 days.

(21) Appl. No.: 10/612,649

(22) Filed: Jul. 2, 2003

(65) Prior Publication Data
US 2004/0012739 A1    Jan. 22, 2004

(30) Foreign Application Priority Data
Jul. 16, 2002    (KR)    ............... 2002-41709

(51) Int. Cl.
*G02F 1/1335*    (2006.01)
(52) U.S. Cl. ............... 349/114; 349/123; 349/187
(58) Field of Classification Search ............... 349/113, 349/114, 123, 126, 106, 139, 187
See application file for complete search history.

(56) References Cited

U.S. PATENT DOCUMENTS

| 6,452,654 B2 * | 9/2002 | Kubo et al. | ............... 349/114 |
| 6,771,334 B2 * | 8/2004 | Kubota et al. | ............... 349/106 |
| 2002/0054269 A1 * | 5/2002 | Maeda et al. | ............... 349/181 |

FOREIGN PATENT DOCUMENTS

| JP | 10-307297 | 11/1998 |
| JP | 10307297 | 11/1998 |
| JP | 2000-29030 | 1/2000 |
| JP | 2000029030 | 1/2000 |
| JP | 2000-250065 | 9/2000 |
| JP | 2002-229048 | 8/2002 |
| KR | 1020020010200 | 2/2002 |

OTHER PUBLICATIONS

PCT Notification of Transmittal of the International Search Report of the Declaration; International application No. PCT/KR03/01388; International filing date: Jul. 14, 2003; Date of Mailing: Dec. 1, 2003.
Taiwanese Office Action dated Jul. 5, 2006 and translation for R.O.C. patent Application No. 92119317 (All references in Office Action are cited above.).

* cited by examiner

*Primary Examiner*—Thoi V Duong
(74) *Attorney, Agent, or Firm*—Cantor Colburn LLP

(57) ABSTRACT

A reflective-transmissive type liquid crystal display device and a method for fabricating the reflective-transmissive type liquid crystal display device are provided. The reflective-transmissive type liquid crystal display device includes a pixel electrode having a transparent electrode for displaying information in a dark place where light is insufficiently provided, a reflective electrode for displaying information in a place where light is sufficiently provided, and an orientation film having an orientation groove provided on an upper surface of the pixel electrode, the direction of the orientation groove being varied depending on a shape of the reflective electrode. The reflective-transmissive type liquid crystal display device prevents the generation of an afterimage, which is generated when a response speed of liquid crystal is lowered due to the impurities or ions stacked at a boundary of the reflective electrode and the transparent electrode, thereby improving quality of display.

23 Claims, 15 Drawing Sheets

FIG.2
(PRIOR ART)
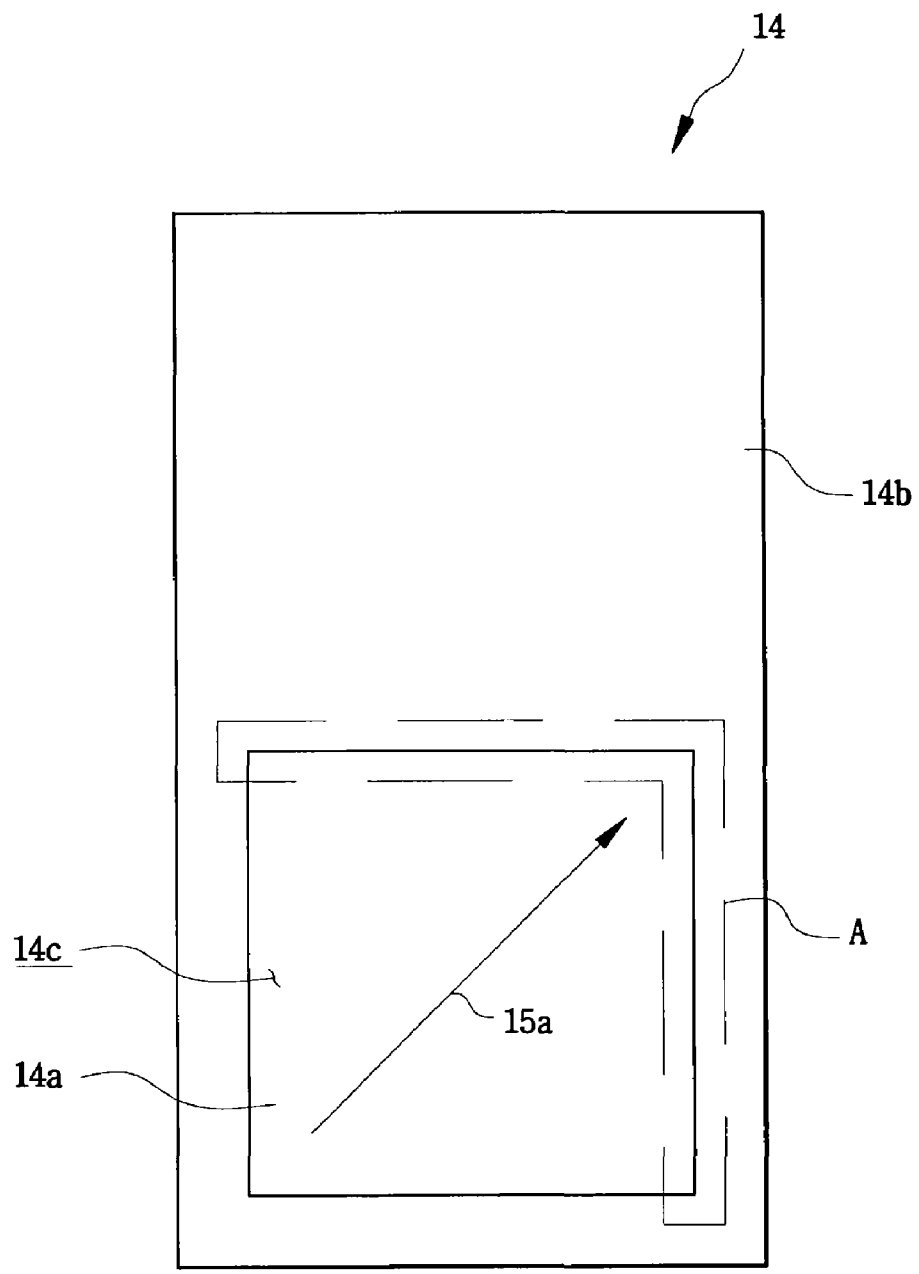
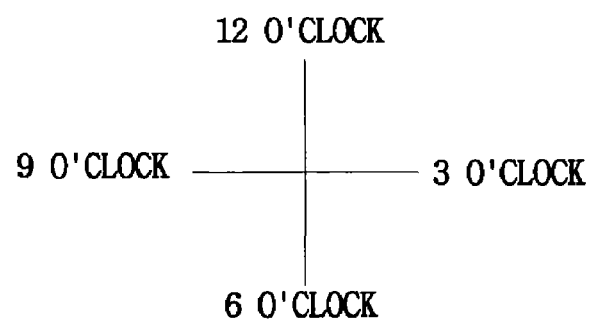

FIG.3
(PRIOR ART)
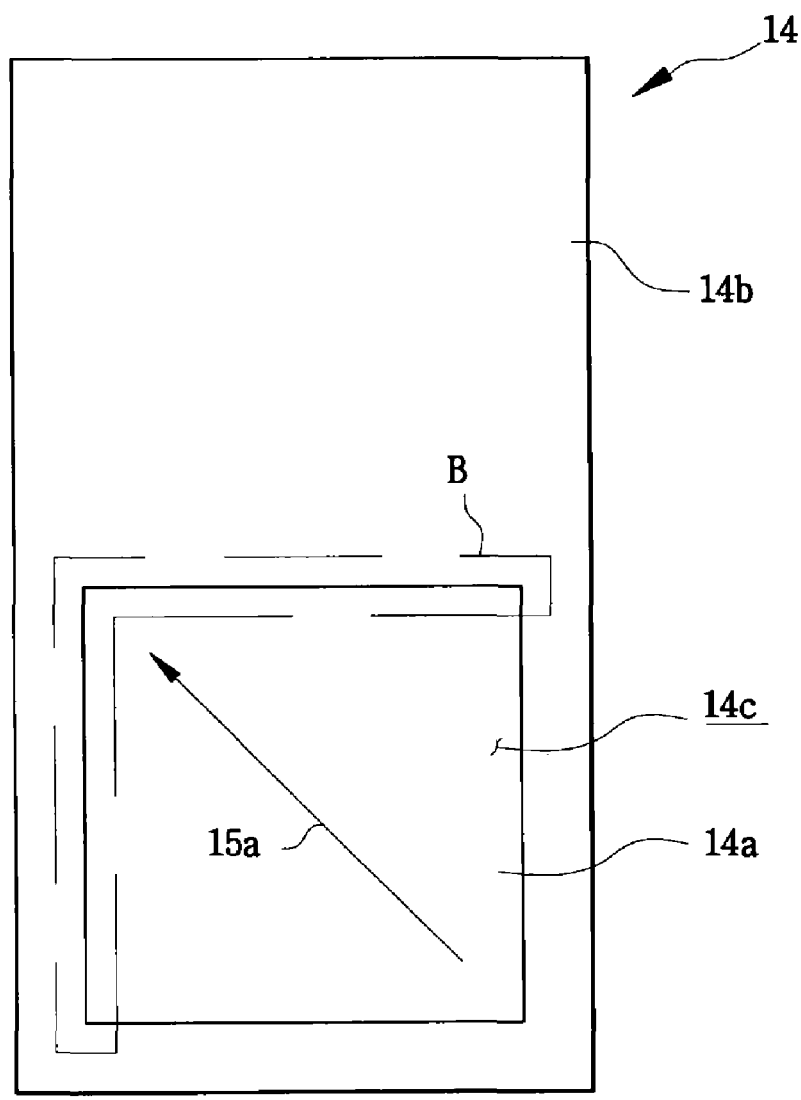
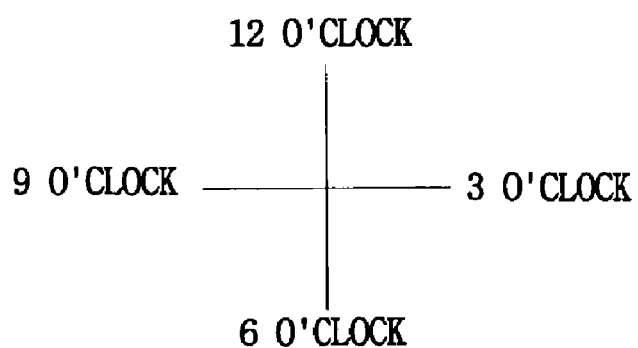

FIG.4
(PRIOR ART)
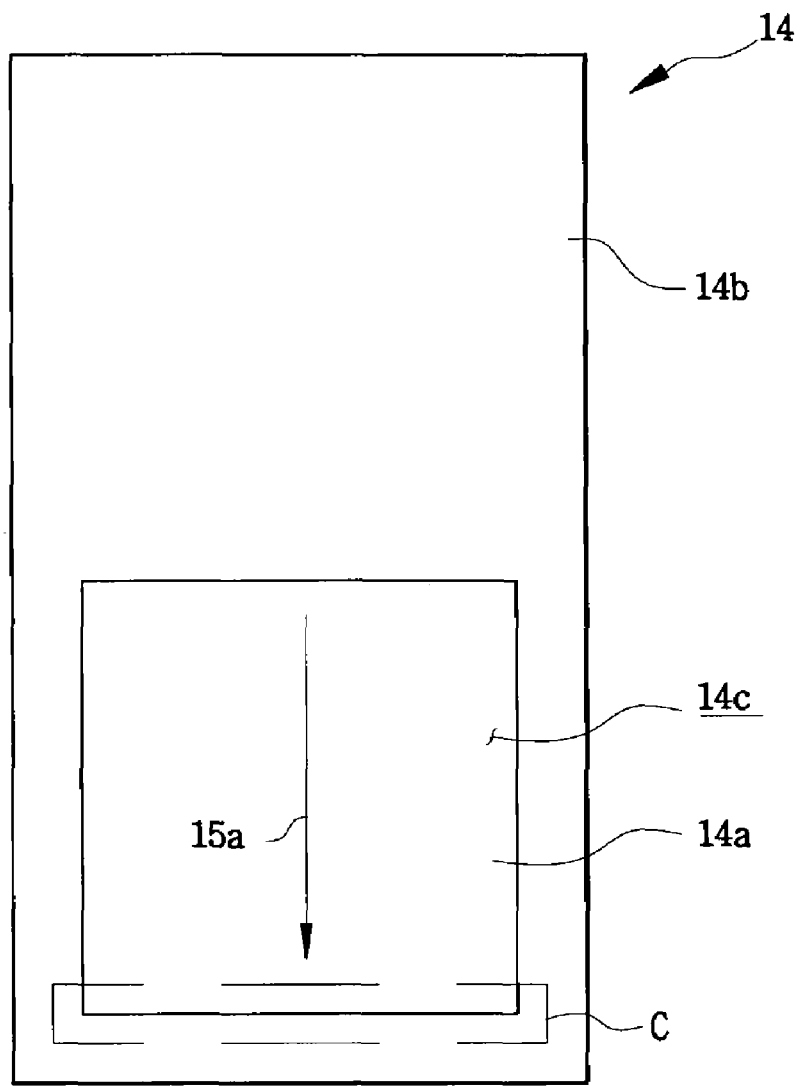
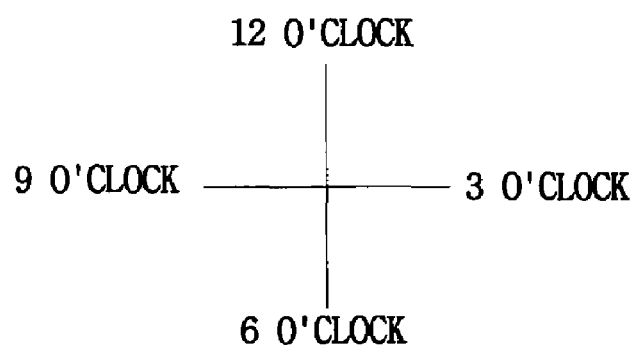

FIG. 13
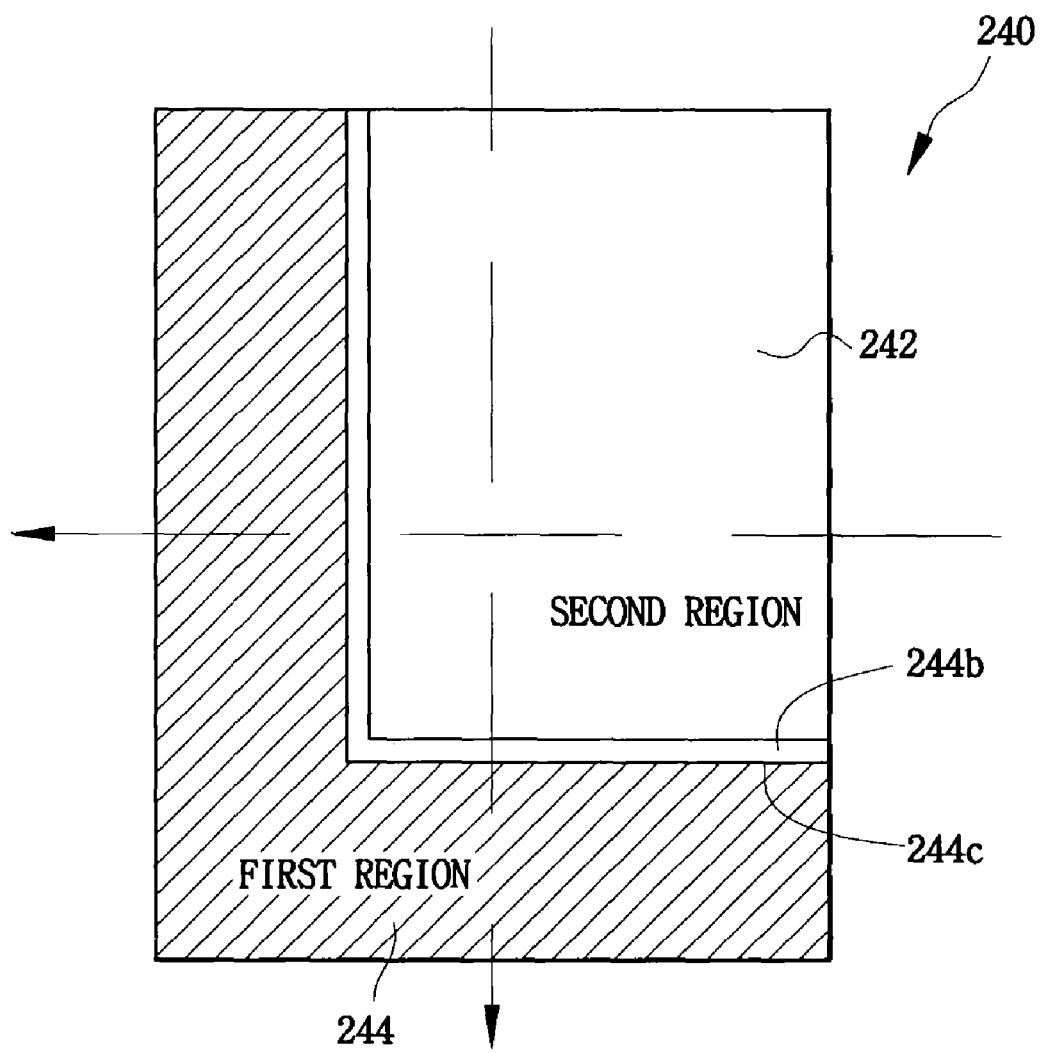
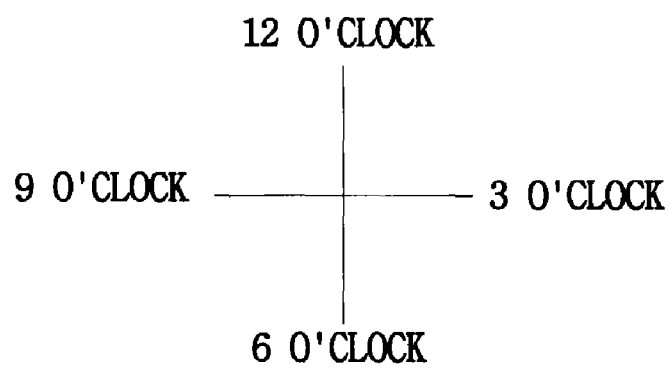

FIG. 14
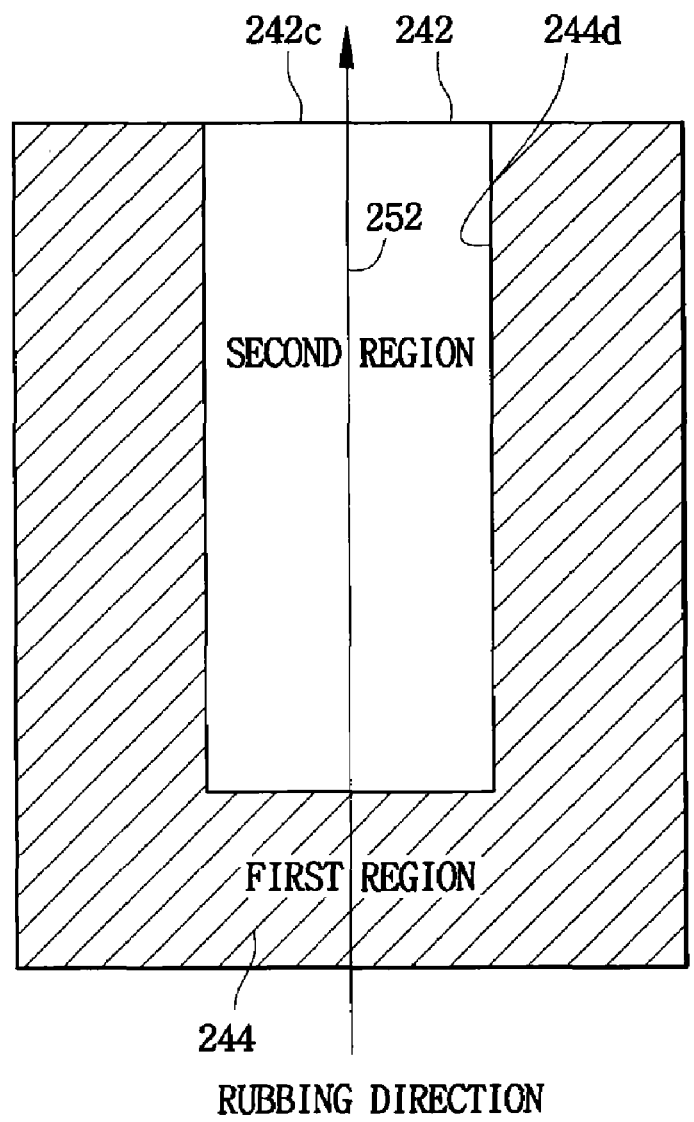
RUBBING DIRECTION
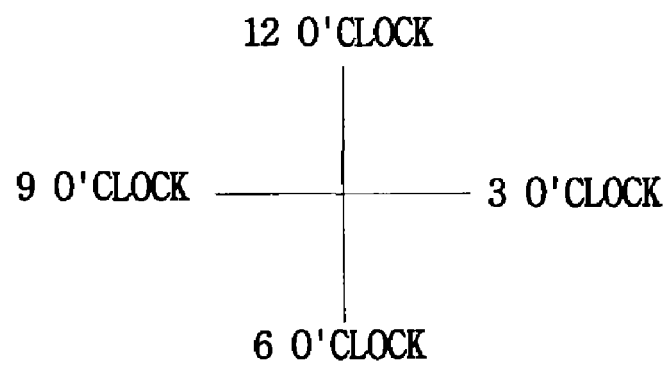

FIG. 15
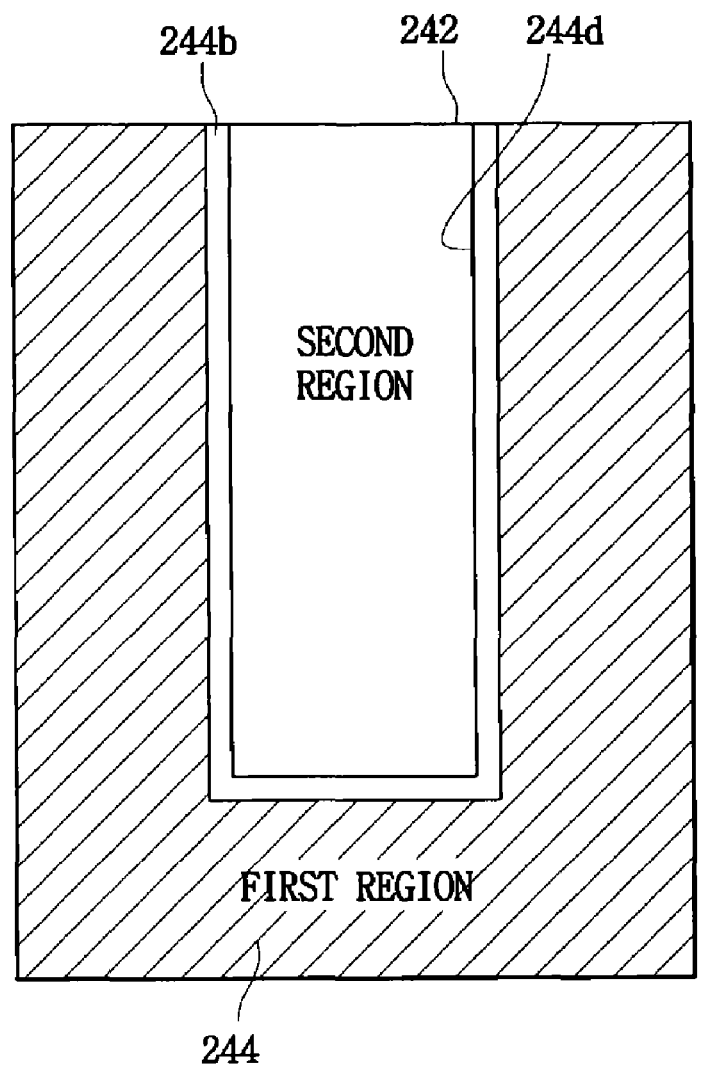
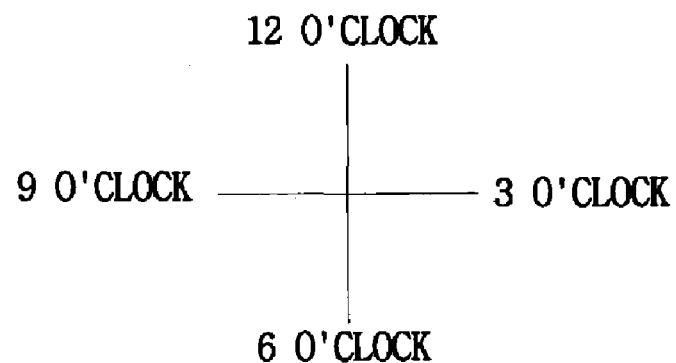

REFLECTIVE-TRANSMISSIVE TYPE LIQUID CRYSTAL DISPLAY DEVICE AND METHOD FOR FABRICATING THE SAME

BACKGROUND OF THE INVENTION

1. Field of the Invention

The present invention relates to a reflective-transmissive type liquid crystal display device and a method for fabricating the same, and more particularly to a reflective-transmissive type liquid crystal display device and a method for fabricating the same, which can prevent afterimage from generating during a display process caused by ions and impurities remained in an orientation film when forming the orientation film, thereby improving quality of display.

2. Description of the Related Art

Liquid crystal display devices may be fabricated to have a slimmer, smaller and lighter structure regardless of a screen size thereof.

Such liquid crystal display devices are remarkably different from cathode ray tube (CRT) type display devices, in which thickness, volume and weight thereof increase proportional to a size thereof.

Different from the CRT type display devices, the liquid crystal display devices may reduce thickness, volume and weight thereof by filling liquid crystal therein. The liquid crystal has a thickness of few micrometers (μm), but controls quality of light.

The liquid crystal display devices further require light to display image information, since the liquid crystal does not generate light itself, but only controls quantity of light.

The liquid crystal display devices are classified as reflective type liquid crystal display devices, transmissive type liquid crystal display devices and reflective-transmissive type liquid crystal display devices depending on kinds of light sources as used.

The reflective type liquid crystal display devices display image information using external light, such as solar light, indoor illuminating light and outdoor illuminating light. The reflective type liquid crystal display devices display the image information with low power consumption because these devices consume power only in controlling the liquid crystal.

However, the reflective type liquid crystal display devices may not display image information if the external light is not provided or insufficiently provided thereto.

The transmissive type liquid crystal display devices obtain artificial light by using, for example, a cold cathode fluorescent type lamp (CCFL), and display image information by passing the artificial light through the liquid crystal. Therefore, the transmissive type liquid crystal display devices may display image information under any environmental conditions regardless of the external light.

However, the transmissive type liquid crystal display devices display image information at high power consumption because these devices generate light by consuming electric energy even when the external light is sufficiently provided thereto.

The reflective-transmissive type liquid crystal display devices have advantages of the reflective type and transmissive type liquid crystal display devices. The reflective-transmissive type liquid crystal display devices display image information using the artificial light where the external light is not provided or insufficiently provided. In addition, the reflective-transmissive type liquid crystal display devices display image information using the external light where the external light is sufficiently provided.

Accordingly, the reflective-transmissive type liquid crystal display devices may remarkably reduce power consumption as compared with the transmissive type liquid crystal display devices, while displaying image information regardless of environmental conditions thereof.

FIG. 1 is a sectional view showing a conventional reflective-transmissive type liquid crystal display device.

Referring to FIG. 1, a conventional reflective-transmissive type liquid crystal display device 100 includes a TFT (Thin Film Transistor) substrate 10, a color filter substrate 20 and a liquid crystal 30.

In addition, the reflective-transmissive type liquid crystal display device 100 includes a driving module (not shown), which generates a driving signal to control the liquid crystal 30 to display an image.

The TFT substrate 10 includes a transparent substrate 11, a thin film transistor 12, an organic insulation layer 13, a pixel electrode 14 and an orientation film 15.

The thin film transistor 12 is arranged on the transparent substrate 11 in a matrix configuration. The thin film transistor 12 includes a gate electrode 12a, a channel layer 12b, a source electrode 12c and a drain electrode 12d.

The organic insulation layer 13 is disposed on an upper surface of the transparent substrate 11 in order to insulate the thin film transistor 12. The organic insulation layer 13 is provided with a contact hole 13a for exposing the drain electrode 12d of the thin film transistor 12.

The pixel electrode 14 is disposed on an upper surface of the organic insulation layer 13. The pixel electrode 14 includes a transparent electrode 14a and a reflective electrode 14b.

The transparent electrode 14a is formed by patterning indium tin oxide (ITO) or indium zinc oxide (IZO), having high light transmittance and conductivity, on the organic insulation layer 13.

The transparent electrode 14a is connected to the drain electrode 12d of the thin film transistor 12 through the contact hole 13a of the organic insulation layer 13. First light (that is generated from an under portion of the transparent substrate 11) passes through the transparent electrode 14a. That is, the first light passes through the transparent electrode 14a to display image information when external light is not provided or insufficiently provided to the device 100.

The reflective electrode 14b is disposed on an upper surface of the transparent electrode 14a. The reflective electrode 14b includes a metal having high light reflectivity. The reflective electrode 14b reflects second light having a direction opposite to a direction of the first light in order to display image information.

An opening window 14c is disposed at a center of the reflective electrode 14b to partially expose the transparent electrode 14a, so the reflective electrode 14b has an area smaller than that of the transparent electrode 14a.

The first light passes through the opening window 14c to display image information in a dark place where the external light is insufficiently provided.

The orientation film 15 is disposed over the entire area of an upper surface of the transparent substrate 11 with a shallow thickness after the pixel electrode 14 has been formed on the transparent substrate 11.

The orientation film 15 prevents the liquid crystal 30 from being randomly aligned. That is, the liquid crystal 30 is aligned in a predetermined pattern by the orientation film 15. To this end, an orientation groove (15a in FIGS. 2 to 4) is disposed on an upper surface of the orientation film 15.

The orientation groove 15a is regularly disposed on the orientation film 15 through a rubbing process. In order to form the orientation groove 15a, a rubbing fabric having piles rotates and forwardly moves while making contact with the orientation film 15.

The color filter substrate 20 is coupled to the TFT substrate 10 after the orientation film 15 has been formed on the TFT substrate 10.

The color filter substrate 20 includes a transparent substrate 21, a color filter 22, and a common electrode 23. The color filter 22 is disposed on the transparent substrate 21 in opposition to the pixel electrode 14 disposed on the TFT substrate 10.

The common electrode 23 is disposed on an entire surface of the color filter 22 such that the color filter 22 covers the transparent substrate 21.

The liquid crystal 30 is interposed between the color filter substrate 20 and the TFT substrate 10.

However, the above-mentioned conventional reflective-transmissive type liquid crystal display device 100 generates an afterimage during a display process, thereby deteriorating quality of image information. The afterimage is generated due to an orientation of the pixel electrode 14 and the orientation groove 15a.

FIG. 2 is a schematic view of the conventional reflective-transmissive type liquid crystal display device having an orientation groove oriented in the 1 o'clock direction, FIG. 3 is a schematic view of the conventional reflective-transmissive type liquid crystal display device having an orientation groove oriented in the 11 o'clock direction, and FIG. 4 is a schematic view of the conventional reflective-transmissive type liquid crystal display device having an orientation groove oriented in the 6 o'clock direction.

Referring to FIG. 2, when the orientation groove 15a is oriented in the 1 o'clock direction, the liquid crystal 30 is stably aligned without causing any problems at the reflective electrode 14b of the pixel electrode 14. However, a response speed of the liquid crystal 30 is deteriorated at an inner part of the opening window 14c, so that the afterimage is generated in the inner part of the opening window 14c. In FIG. 2, an afterimage region is shown as "A". The afterimage region A is opposite to the orientation groove 15a.

Referring to FIG. 3, when the orientation groove 15a is oriented in the 11 o'clock direction, the liquid crystal 30 is stably aligned without causing any problems at the reflective electrode 14b of the pixel electrode 14. However, the response speed of the liquid crystal 30 is also deteriorated at the inner part of the opening window 14c, so that the afterimage is generated in the inner part of the opening window 14c. In FIG. 3, the afterimage region is shown as "B". The afterimage region B is opposite to the orientation groove 15a.

Referring to FIG. 4, when the orientation groove 15a is oriented in the 6 o'clock direction, the liquid crystal 30 is stably aligned without causing any problems at the reflective electrode 14b of the pixel electrode 14. However, the response speed of the liquid crystal 30 is also deteriorated at the inner part of the opening window 14c, so that the afterimage is generated in the inner part of the opening window 14c. In FIG. 4, the afterimage region is shown as "C". The afterimage region C is opposite to the orientation groove 15a.

Referring to FIGS. 2 to 4, the afterimage regions A, B and C are commonly related to a position of the opening window 14c disposed in the reflective electrode 14b and a rubbing direction.

When performing a rubbing process, the ions or impurities attached to a pile of a rubbing fabric are outwardly moved due to a rotation of the rubbing fabric. The ions or impurities are not discharged out of the pixel electrode 14, but stacked at a boundary between the transparent electrode 14a and the reflective electrode 14b because a step portion is disposed at the boundary between the transparent electrode 14a and the reflective electrode 14b.

As a result, the response speed of the liquid crystal 30 shown in FIG. 1 is deteriorated due to the impurities or ions stacked at the boundary between the transparent electrode 14a and the reflective electrode 14b. If the response speed of the liquid crystal 30 is slower than a standard speed, the afterimage is generated, thereby deteriorating quality of image information.

BRIEF SUMMARY OF THE INVENTION

The present invention provides a reflective-transmissive type liquid crystal display device capable of preventing an afterimage from generating when a response speed of liquid crystal is deteriorated due to the impurities or ions stacked at a boundary of a reflective electrode and a transparent electrode and a rubbing manner of an orientation groove.

The present invention provides a method for fabricating a reflective-transmissive type liquid crystal display device capable of preventing an afterimage from generating when a response speed of liquid crystal is lowered due to the impurities or ions stacked at a boundary of a reflective electrode and a transparent electrode and a rubbing manner of an orientation groove.

In one aspect of the invention, there is provided a reflective-transmissive type liquid crystal display device comprising: a first substrate, including a thin film transistor disposed on a first transparent substrate, an organic insulation layer disposed on the first transparent substrate to insulate the thin film transistor, the organic insulation layer having a contact hole for exposing an output terminal of the thin film transistor, a pixel electrode having a transparent electrode connected to the output terminal of the thin film transistor through the contact hole formed on the organic insulation layer and a reflective electrode disposed on a first region of the transparent electrode, a second region of the transparent electrode being exposed without being covered by the reflective electrode, and an orientation film coated on an upper surface of the pixel electrode and having an orientation groove rubbed in a first direction, the orientation groove preventing the impurity from being stacked at a boundary between the first and second regions of the transparent electrode; a second substrate, including a color filter disposed on a second transparent substrate in opposition to the pixel electrode and a common electrode disposed on an upper surface of the color filter and facing the pixel electrode; and a liquid crystal interposed between the first and second substrates.

In another aspect, there is provided a method for fabricating a reflective-transmissive type liquid crystal display device, the method comprising: forming a thin film transistor on a first transparent substrate; depositing an organic insulation layer on the first transparent substrate to insulate the thin film transistor, the organic insulation layer having a contact hole for exposing an output terminal of the thin film transistor; forming a pixel electrode on the organic insulation layer, the pixel electrode having a transparent electrode connected to the output terminal of the thin film transistor through the contact hole and a reflective electrode formed on a first region of the transparent electrode, a second region of the transparent electrode being exposed without covering by the reflective electrode; coating an orientation film on an upper surface of the pixel electrode; rubbing the orientation film in a first direction to form an orientation groove on the orientation film, the orientation groove preventing impurity from being stacked at a boundary formed between the first and second regions of the transparent electrode; forming a color filter on a second transparent substrate in opposition to the pixel electrode; forming a common electrode formed on an upper surface of the color filter, the common electrode facing the pixel electrode; and interposing a liquid crystal between the common electrode and the pixel electrode on which the orientation film and the orientation groove are formed.

The reflective-transmissive type liquid crystal display device of the present invention may include various structures of the pixel electrode and change the rubbing direction of the orientation groove. The reflective-transmissive type liquid crystal display device may prevent afterimage from being generated due to the impurities or ions stacked at the boundary between the transparent electrode and the reflective electrode, thereby increasing display quality of image information.

BRIEF DESCRIPTION OF THE DRAWINGS

The above and other advantages of the present invention will become readily apparent by reference to the detailed description and the accompanying drawings wherein:

FIG. 2 is a schematic view of a conventional reflective-transmissive type liquid crystal display device having an orientation groove oriented in the 1 o'clock direction;

FIG. 3 is a schematic view of a conventional reflective-transmissive type liquid crystal display device having an orientation groove oriented in the 11 o'clock direction;

FIG. 4 is a schematic view of a conventional reflective-transmissive type liquid crystal display device having an orientation groove oriented in the 6 o'clock direction;

FIG. 13 is a plan view showing a rubbing direction of an orientation groove disposed on a pixel electrode, according to another embodiment of the present invention;

FIG. 14 is a plan view showing a rubbing direction of an orientation groove disposed on a pixel electrode, according to another embodiment of the present invention;

FIG. 15 is a plan view showing a rubbing direction of an orientation groove disposed on a pixel electrode, according to another embodiment of the present invention.

DETAILED DESCRIPTION OF THE INVENTION

Figure 1:
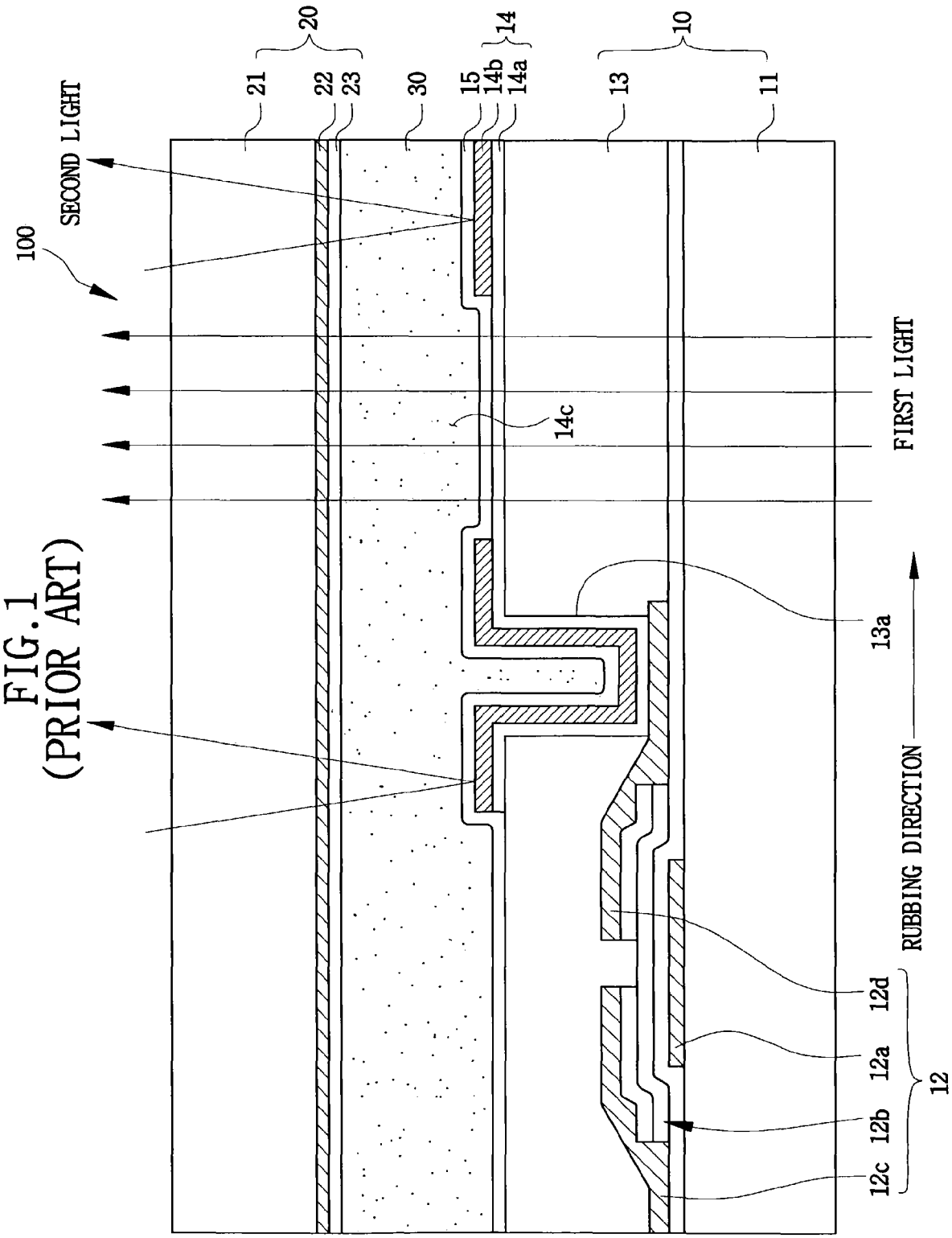
FIG. 1 is a sectional view of a conventional reflective-transmissive type liquid crystal display device.
Figure 5:
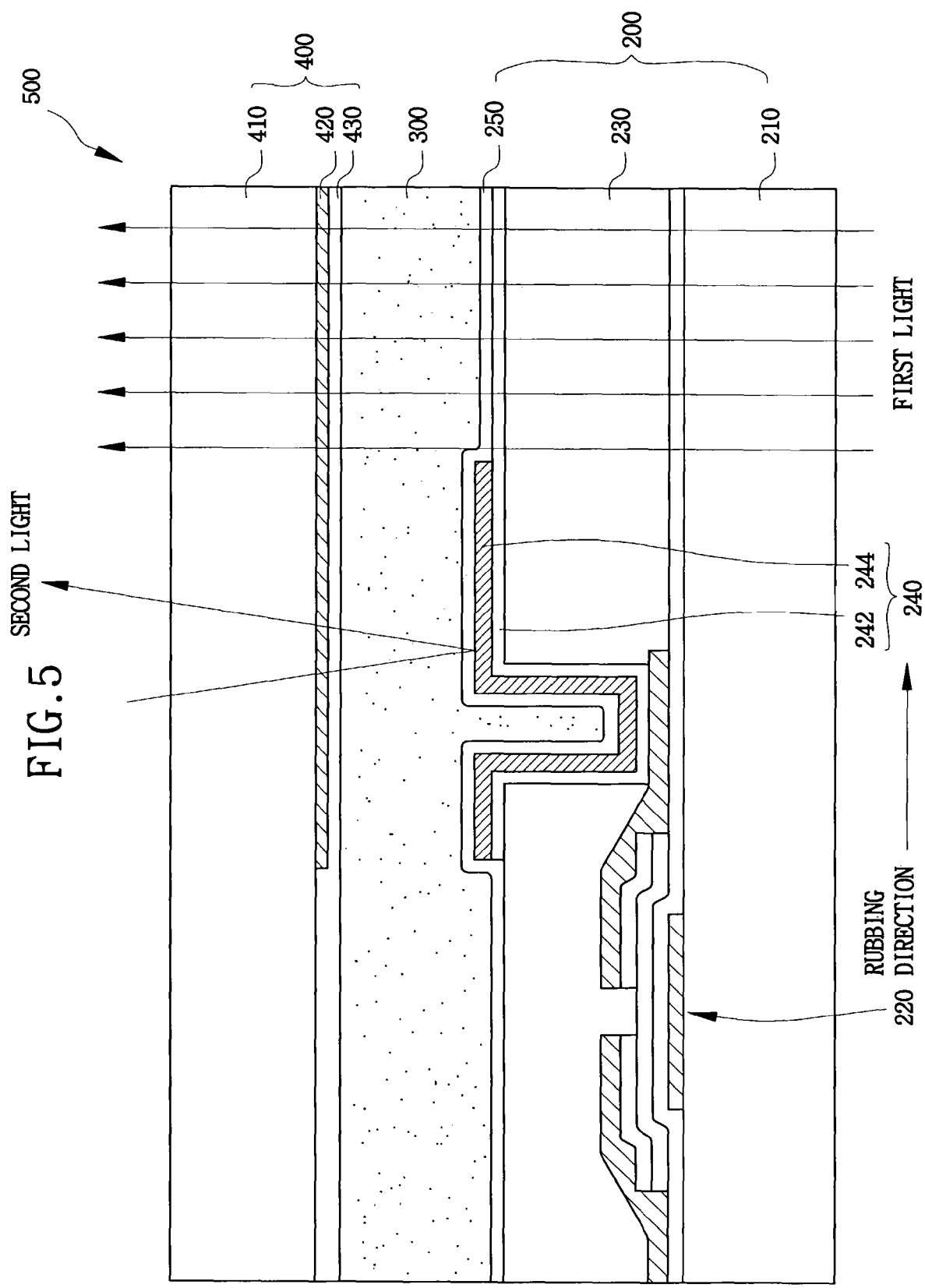
FIG. 5 is a sectional view of a reflective-transmissive type liquid crystal display device according to an embodiment of the present invention.

FIG. 5 is a sectional view of a reflective-transmissive type liquid crystal display device according to an embodiment of the present invention.

Referring to FIG. 5, a reflective-transmissive type liquid crystal display device 500 includes a TFT substrate 200, a liquid crystal 300 and a color filter substrate 400.

The TFT substrate 200 has a first transparent substrate 210, a thin film transistor 220, an organic insulation layer 230, a pixel electrode 240 and an orientation film 250.

Figure 6:
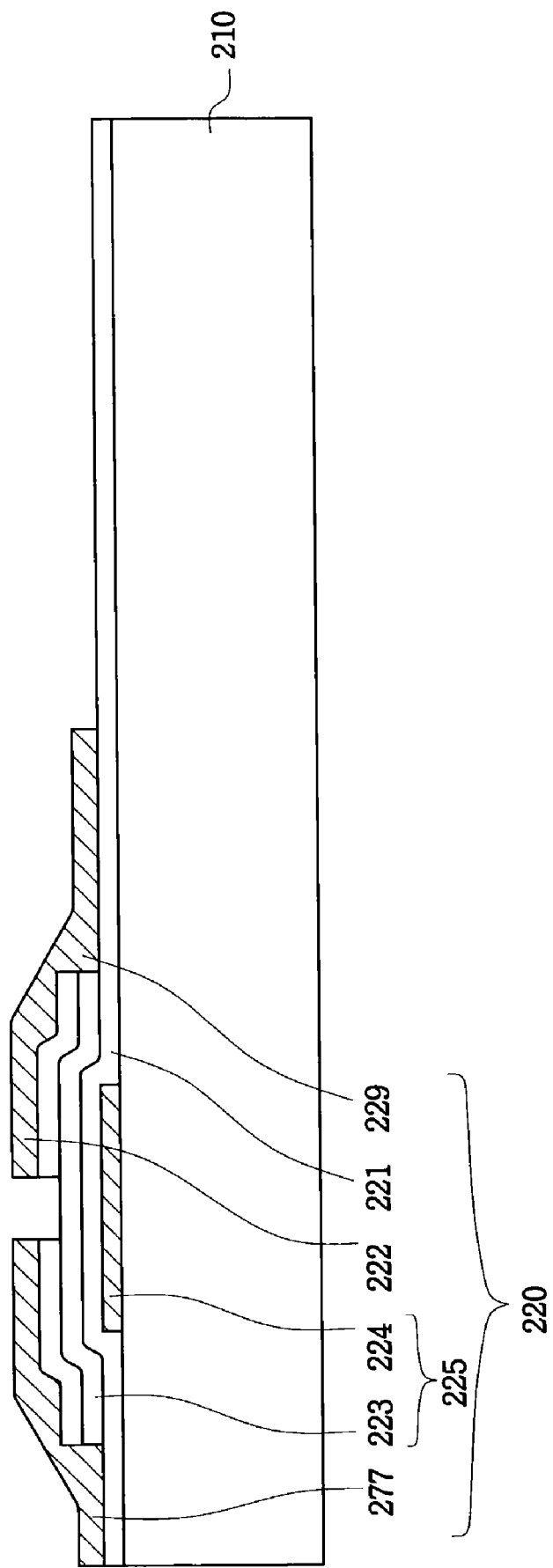
FIG. 6 is a sectional view showing a thin film transistor of the present invention.

FIG. 6 is a sectional view showing the thin film transistor of FIG. 5.

The thin film transistor 220 is arranged in the first transparent substrate 210 in a matrix configuration. The thin film transistor 220 includes an insulation layer 221, a gate electrode 224, a channel layer 223, a source electrode 227 and a drain electrode 229.

In order to form the thin film transistor 220, the gate electrode 224 is firstly formed on the first transparent substrate 210.

The gate electrode 224 is formed by patterning a gate metal through a photolithography process after depositing the gate metal, such as an aluminum alloy, on an entire surface of the first transparent substrate 210.

The gate electrode 224 is arranged in a matrix configuration and gate electrodes belonging to the same row are connected to each other in parallel through one gate line (not shown).

The gate electrode 224 is insulated by means of the insulation layer 221 and the channel layer 223 is formed on an upper surface of the insulation layer 221 corresponding to an upper surface of the gate electrode 224.

The channel layer 223 is formed by patterning an amorphous silicon thin film and an n+ amorphous silicon thin film using a photolithography process, which are formed on the upper surface of the insulation layer 221.

Reference numeral 222 represents an amorphous silicon pattern and reference numeral 225 represents an n+ amorphous silicon pattern.

In addition, a source/drain metal thin film is deposited on an entire surface of the first transparent substrate 210. The source/drain metal thin film is patterned through the photolithography process so that the source electrode 227 and the drain electrode 229 are formed on the upper surface of the n+ amorphous silicon pattern 225. The source and drain electrodes 227 and 229 are insulated from each other.

A data line is formed when forming the source electrode 227. The data line is connected to source electrodes belonging to the same column in parallel.

Figure 7:
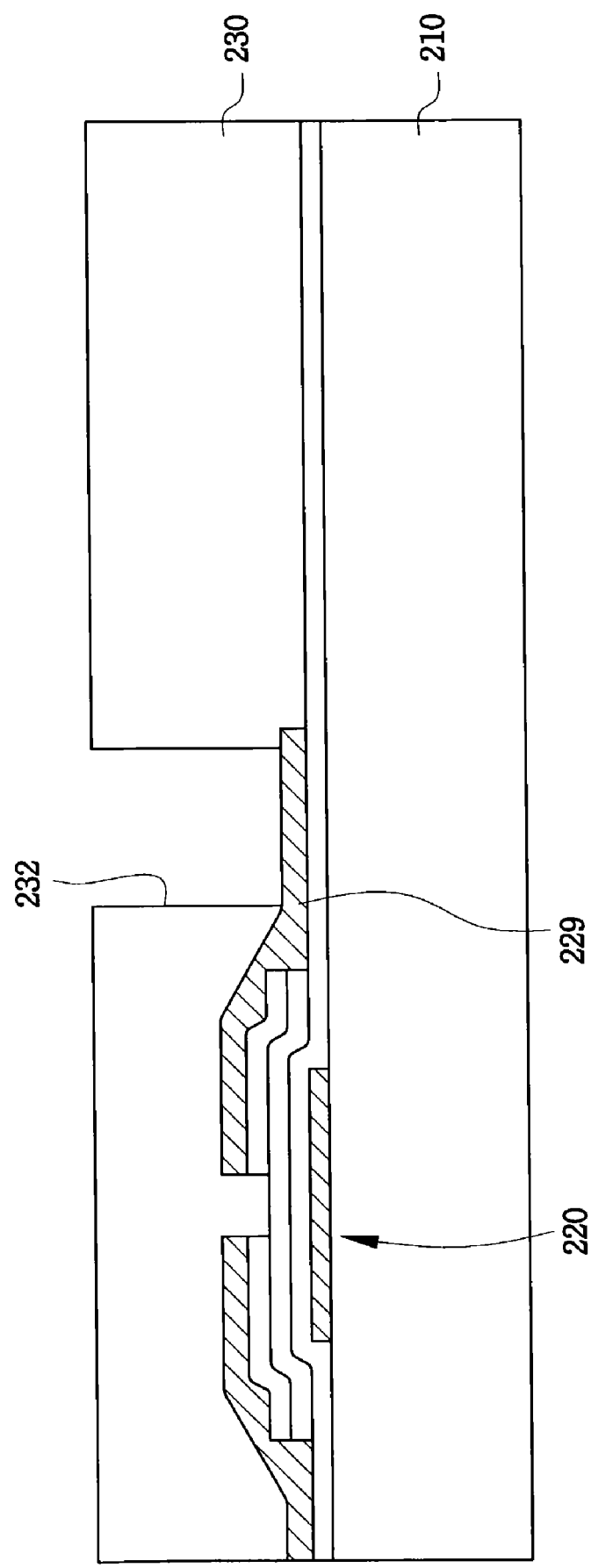
FIG. 7 is a sectional view showing an organic insulation layer of the present invention.

FIG. 7 is a sectional view showing the organic insulation layer of FIG. 5.

Referring to FIG. 7, the organic insulation layer 230 is formed on an upper surface of the first transparent substrate 210 in order to insulate the thin film transistor 220. A contact hole 232 for exposing the drain electrode 229 of the thin film transistor 220 is formed in the organic insulation layer 230 through the photolithography process.

Figure 8:
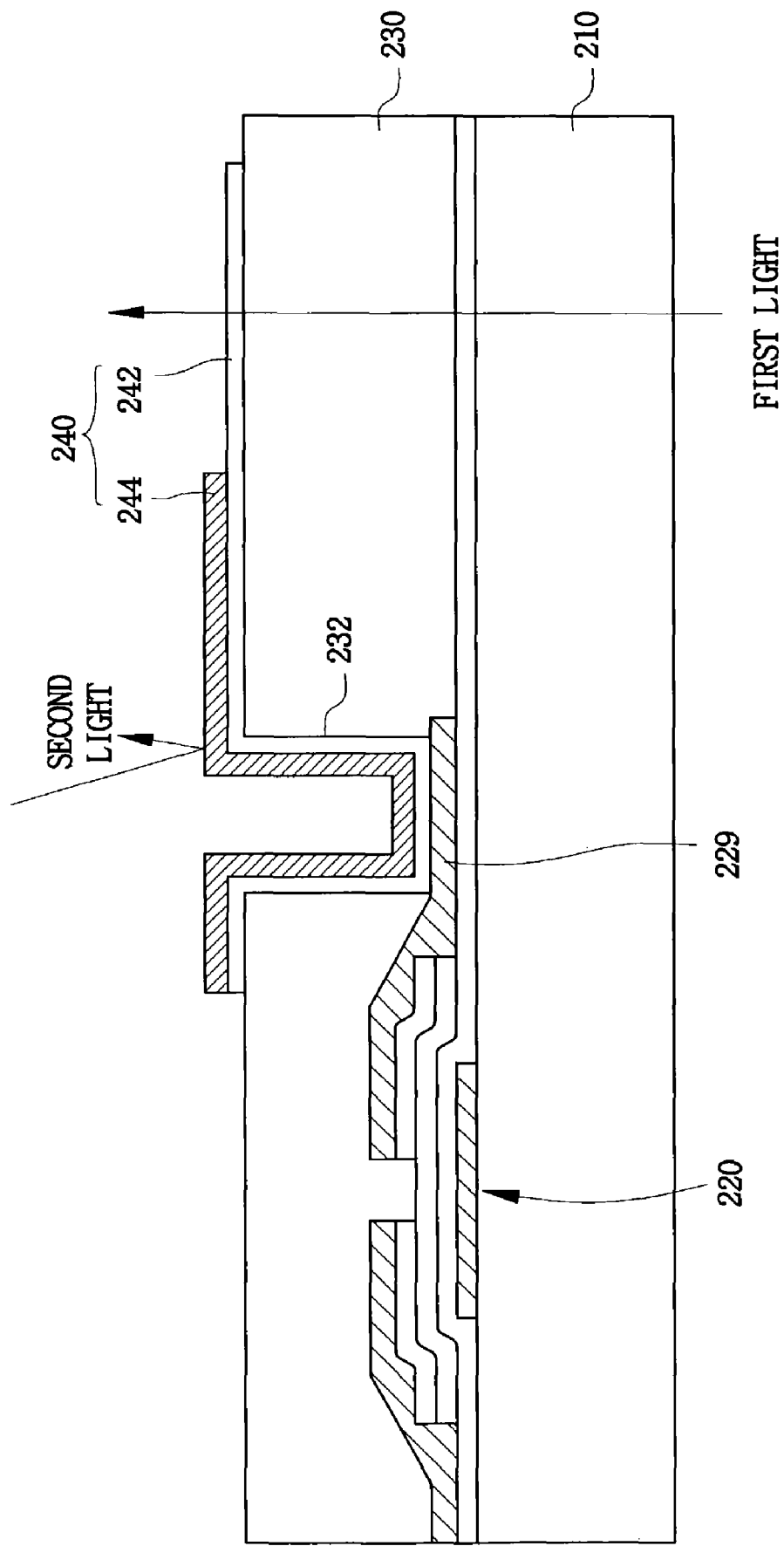
FIG. 8 is a sectional view showing a pixel electrode of the present invention.

FIG. 8 is a sectional view showing the pixel electrode of FIG. 5.

Referring to FIG. 8, the pixel electrode 240 is formed on an upper surface of the organic insulation layer 230. The pixel electrode 240 includes a transparent electrode 242 and a reflective electrode 244.

The transparent electrode 242 has a rectangular shape and is formed by depositing and patterning indium tin oxide (ITO)

or indium zinc oxide (IZO) having high light transmittance and conductivity, on the organic insulation layer 230, through the photolithography process.

The transparent electrode 242 is connected to the drain electrode 229 of the thin film transistor 220 through the contact hole 232 of the organic insulation layer 230.

First light is generated from an under portion of the first transparent substrate 210 and passes through the transparent electrode 242 to display the image information when external light is not provided or insufficiently provided.

The reflective electrode 244 is formed on the upper surface of the transparent electrode 242. The reflective electrode 244 includes a metal having superior light reflectance. Second light having a direction opposite to a direction of the first light is reflected from the reflective electrode 244.

Figure 9:
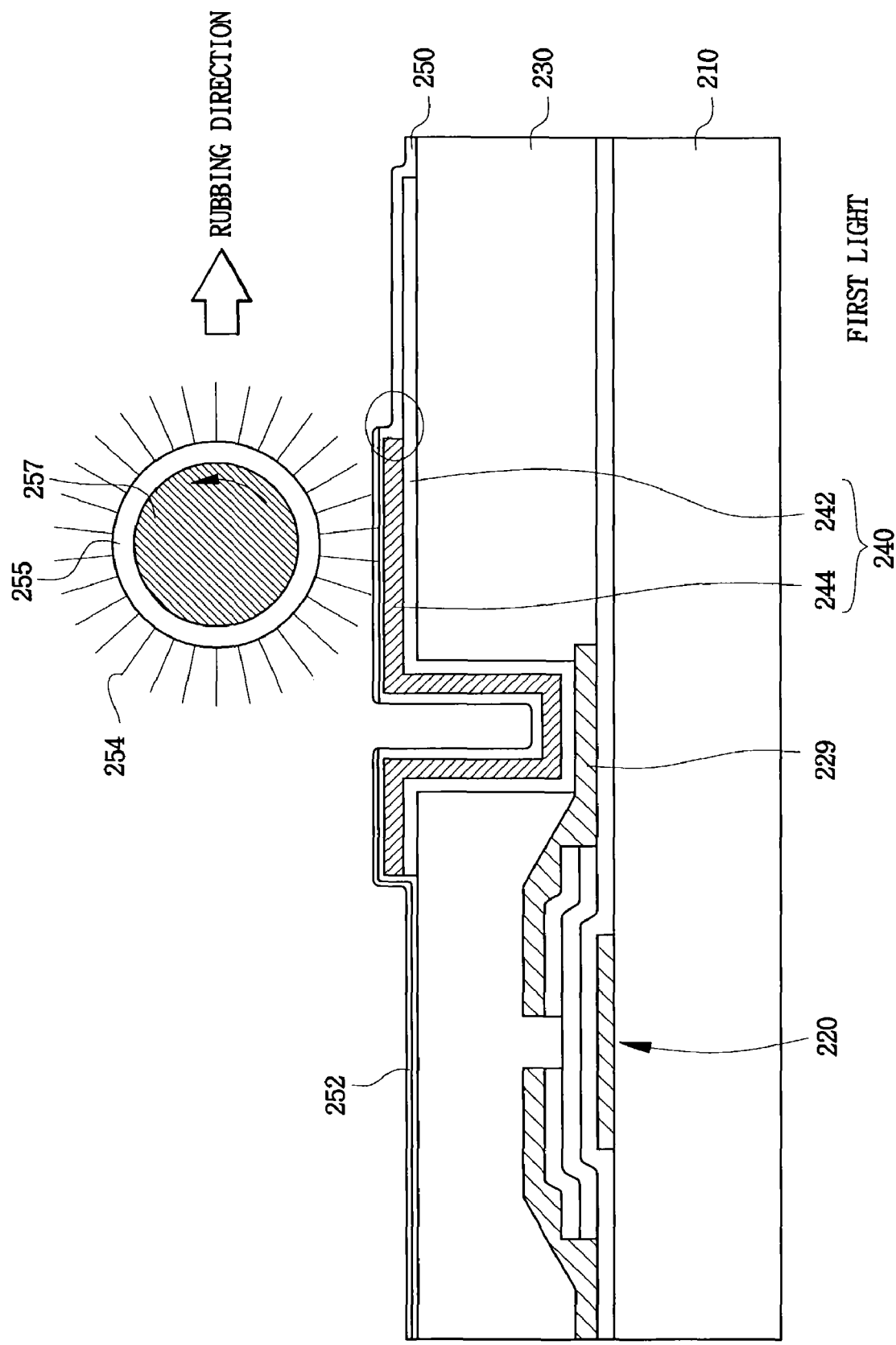
FIG. 9 is a schematic view showing a method for forming an orientation groove in an orientation film of the present invention.

FIG. 9 is a schematic view showing a method for forming an orientation groove in the orientation film of FIG. 5, according to one embodiment of the present invention.

Referring to FIG. 9, the orientation film 250 is formed on an entire surface of the first transparent substrate 210 to allow the pixel electrode 240 to cover the organic insulation layer 230.

The orientation film 250 prevents the liquid crystal 300 from being randomly aligned. The orientation film 250 aligns the liquid crystal 300 in a predetermined pattern. To this end, an orientation groove 252 is formed on the orientation film 250.

Since the orientation film 250 has a thin thickness, it has the profile same to those of the transparent electrode 242 and the reflective electrode 244. Accordingly, the profile of the orientation film 250 varies at a boundary region (shown in FIG. 9 as a circle "D") between the transparent electrode 242 and the reflective electrode 244.

The orientation film 250 having the profile corresponding to the profiles of the transparent and reflective electrodes 242 and 244 is formed with the orientation groove 252, which is regularly aligned through a rubbing process.

In order to form the orientation groove 252, as shown in FIG. 9, piles 254 of a rubbing fabric 255 wound around an orientation roller 257 rotate and forwardly move while making contact with the orientation film 250.

Figure 10:
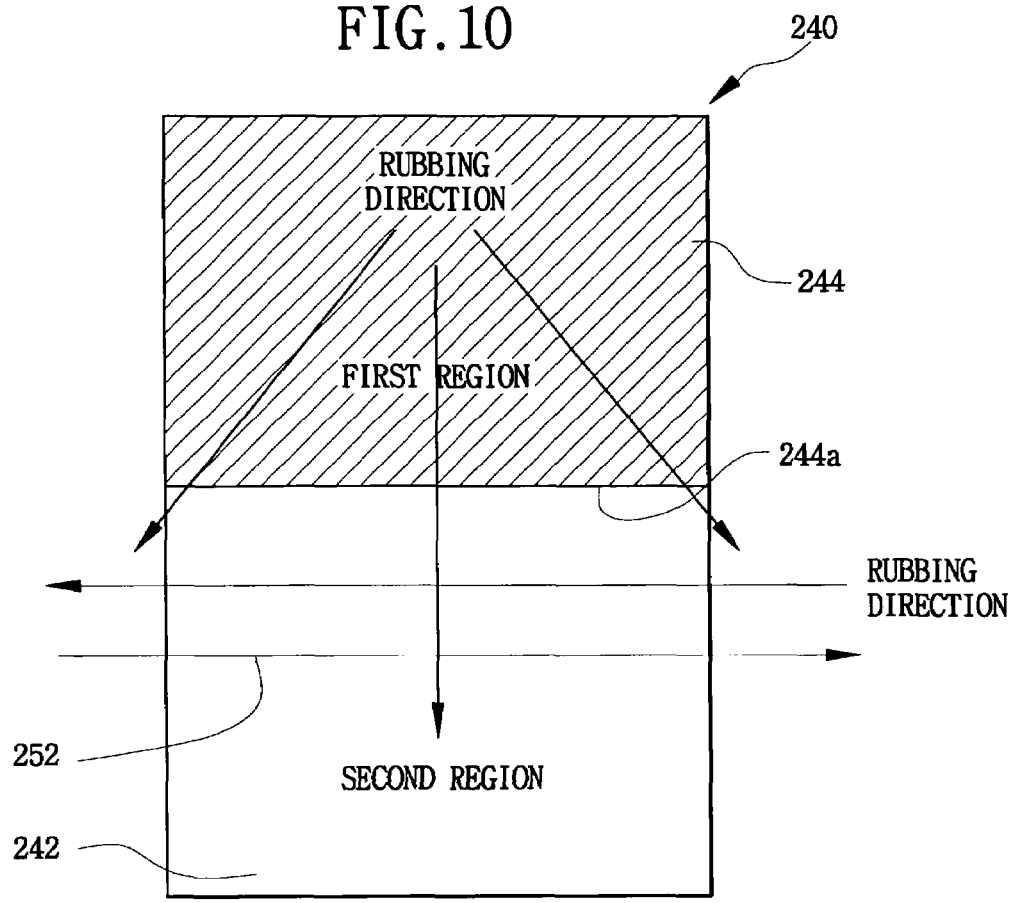
FIG. 10 is a plan view showing a rubbing direction of an orientation groove disposed on a pixel electrode, according to an embodiment of the present invention.

FIG. 10 is a plan view showing a rubbing direction of the orientation groove disposed on a pixel electrode of FIG. 5, according to one embodiment of the present invention.

Referring to FIG. 10, the reflective electrode 244 formed on the upper surface of the transparent electrode 242 has an area smaller than that of the transparent electrode 242. The reflective electrode 244 having the smaller area is formed such that a first boundary 244a is formed between the reflective electrode 244 and the transparent electrode 242. The first boundary 244a may have a linear shape in a layout of the pixel electrode 240.

As shown in FIG. 10, a first region (shown in FIG. 10 as hatching lines) of the transparent electrode 242, on which the reflective electrode 244 is disposed, meets with a second region of the transparent electrode 242, which is not covered by the reflective electrode 244, at the first boundary 244a.

The rubbing direction of the orientation groove 252 in the pixel electrode 240 is very important. If the orientation groove 252 is improperly oriented, the ions and impurities attached to the piles 254 remain in the first boundary 244a disposed between the reflective electrode 244 and the transparent electrode 242 having different profiles from each other.

Due to the ions and impurities remained in the first boundary 244a, a response speed of the liquid crystal 300 is lowered as compared with a required response speed of the liquid crystal 300. If the response speed of the liquid crystal 300 is lower than the required response speed, an afterimage is generated, thereby affecting a bad influence on image information to be displayed.

In order to prevent the afterimage caused by the rubbing direction of the orientation groove 252, as shown in FIG. 10, the piles 254 of the rubbing fabric 255 (in FIG. 9) move from the reflective electrode 244 towards the transparent electrode 242.

Since the transparent electrode 242 is rubbed after the reflective electrode 244 has been rubbed, the ions and impurities causing the afterimage may be reduced at the first boundary 244a disposed between the reflective electrode 244 and the transparent electrode 242.

The rubbing direction of the orientation groove 252 may be variously selected to prevent the afterimage from being generated.

Referring to FIG. 10, in order to prevent the afterimage from being generated at the first boundary 244a disposed between the reflective electrode 244 and the transparent electrode 242, the rubbing direction is formed from the 12 o'clock direction to the 6 o'clock direction, from the 12 o'clock direction to the 9 o'clock direction, or from the 12 o'clock direction to the 3 o'clock direction.

In addition, it is also possible to form the rubbing direction from the 3 o'clock direction to the 9 o'clock direction or from the 9 o'clock direction to the 3 o'clock direction in parallel to the first boundary 244a to prevent the afterimage from being generated at the first boundary 244a disposed between the reflective electrode 244 and the transparent electrode 242.

If the rubbing process is carried out from the 6 o'clock direction to the 12, 9 or 3 o'clock direction, the rubbing direction faces the first boundary 244a disposed between the reflective electrode 244 and the transparent electrode 242, so that ions and impurities may be stacked at the first boundary 244a.

Figure 11:
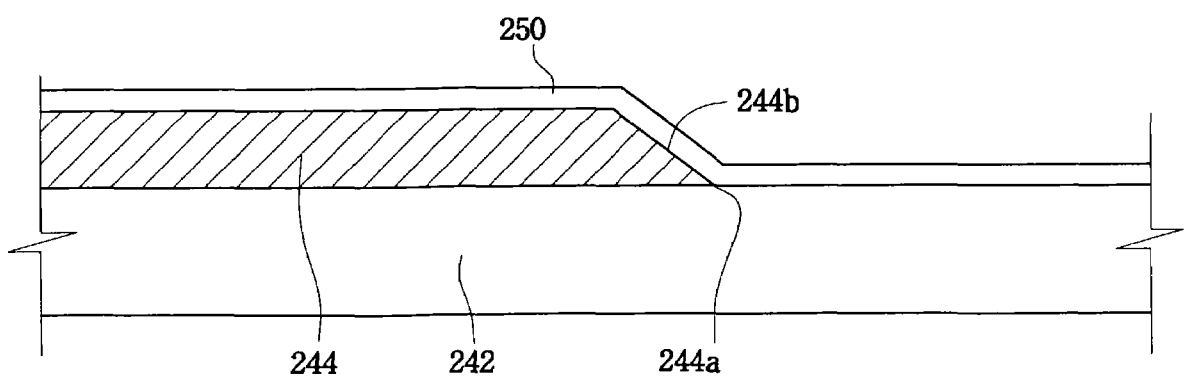
FIG. 11 is a sectional view showing a pixel electrode according to another embodiment of the present invention.

FIG. 11 is a sectional view showing a pixel electrode according to another embodiment of the present invention. In the following description, parts different from those of the embodiment shown in FIGS. 5 to 10 are only described and the same parts described in the embodiment will be omitted to avoid a redundancy.

Referring to FIG. 11, the limitation for the rubbing direction may be solved by forming a slope surface 244b at a sidewall of the reflective electrode 244 corresponding to the first boundary 244a disposed between the first and second regions.

Figure 12:
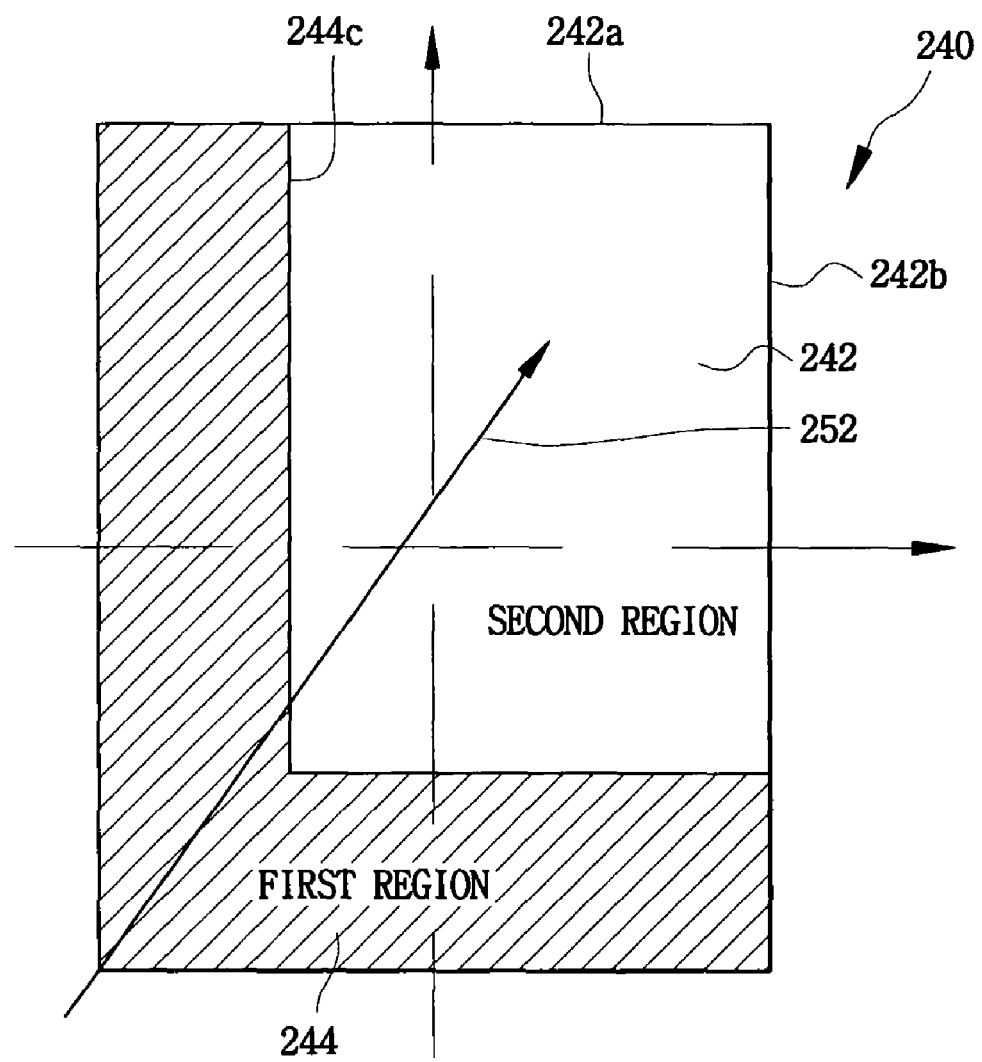
FIG. 12 is a plan view showing a rubbing direction of an orientation groove disposed on a pixel electrode, according to another embodiment of the present invention.

FIG. 12 is a plan view showing a rubbing direction of an orientation groove disposed on a pixel electrode of FIG. 5, according to another embodiment of the present invention. FIG. 12 shows a method for varying the rubbing characteristic of the orientation groove by changing a shape of the reflective electrode of the pixel electrode of FIG. 5.

Referring to FIG. 12, the reflective electrode 244 disposed on the upper surface of the transparent electrode 242 has an area smaller than an area of the transparent electrode 242.

The orientation film 250 is formed over the entire area of the upper surface of the first transparent substrate 210 such that the pixel electrode 240 disposed on the organic insulation layer 230 is covered by the orientation film 250.

The orientation film 250 prevents the liquid crystal 300 from being randomly aligned on the upper surface of the pixel electrode 240. The liquid crystal 300 is aligned in a predetermined pattern by the orientation film 250. To this end, the orientation groove 252 is formed in the orientation film 250.

Since the orientation film 250 has a thin thickness, it has the profile same to those of the transparent electrode 242 and the reflective electrode 244. Accordingly, the profile of the orientation film 250 varies at a second boundary 244*c* disposed between the transparent electrode 242 and the reflective electrode 244.

The orientation film 250 having the various profiles corresponding to the profiles of the transparent electrode 242 and the reflective electrode 244 is formed with the orientation groove 252, which is regularly aligned through a rubbing process.

The rubbing direction of the orientation groove 252 is very important. If the orientation groove 252 is improperly oriented, the ions and impurities attached to the rubbing fabric 255 remain in the second boundary 244*c* of the orientation film 250.

Due to the ions and impurities remained in the second boundary 244*c* of the orientation film 250, a response speed of the liquid crystal 300 is lowered as compared with a required response speed of the liquid crystal 300. If the response speed of the liquid crystal 300 is lower than the required response speed, an afterimage is generated, thereby affecting a bad influence on image information to be displayed.

According to the present embodiment, in order to prevent the afterimage caused by the rubbing direction of the orientation groove 252, the piles 254 of the rubbing fabric 255 (in FIG. 9) are forwarded towards a part of the transparent electrode 242, which is exposed without being covered by the reflective electrode 244 as shown in FIG. 12.

When viewed from a top, the reflective electrode 244 is disposed on a first region (shown in FIG. 12 as hatching lines) of the transparent electrode 242, and thus a second region of the transparent electrode 242 is exposed without being covered by the reflective electrode 244.

The second region includes the second boundary 244*c* for exposing two edges 242*a* and 242*b* of the transparent electrode 242. The edges 242*a* and 242*b* exposed by the second boundary 244*c* are connected to each other. The second boundary 244*c* has an L-shape to expose the two edges 242*a* and 242*b* of the transparent electrode 242. Accordingly, the first region on which the reflective electrode 244 is formed also has the L-shape.

Since the transparent electrode 242 is sequentially rubbed after the reflective electrode 244 having the L-shape has been rubbed, the afterimage affecting a bad influence on image information to be displayed may be reduced.

The rubbing direction of the orientation groove 252 for preventing the afterimage from generating at the second boundary 244*c* disposed between the reflective electrode 244 and the transparent electrode 242 may be variously selected.

Referring to FIG. 12, the rubbing direction may be formed in the 2 o'clock direction, from the 6 o'clock direction to the 3 o'clock direction, from the 6 o'clock direction to the 12 o'clock direction, or from the 9 o'clock direction to the 3 o'clock direction in order to prevent the afterimage from being generated at the second boundary 244*c*.

If the rubbing process is carried out from the 12 o'clock direction to the 6 o'clock direction or from the 3 o'clock direction to the 9 o'clock direction, ions and impurities may be stacked in the rubbing direction and at the second boundary 244*c* disposed between the reflective electrode 244 and the transparent electrode 242.

FIG. 13 is a plan view showing a rubbing direction of an orientation groove disposed on a pixel electrode of FIG. 11, according to another embodiment of the present invention. FIG. 13 shows a method for varying the rubbing characteristic of the orientation groove by changing a shape of the reflective electrode of the pixel electrode of FIG. 11.

Referring to FIG. 13, the slope surface 244*b* is formed at the sidewall of the reflective electrode 244 facing the second boundary 244*c* disposed between the first and second regions of the transparent electrode 242 in order to prevent ions and impurities from remaining in the second boundary 244*c*. The limitation of rubbing directions may be reduced by means of the slope surface 244*b* formed at the sidewall of the reflective electrode 244.

FIG. 14 is a plan view showing a rubbing direction of an orientation groove disposed on a pixel electrode of FIG. 5, according to another embodiment of the present invention. FIG. 14 shows a method for varying the rubbing characteristic of the orientation groove by changing a shape of the reflective electrode of the pixel electrode of FIG. 5.

Referring to FIG. 14, the reflective electrode 244 disposed on the upper surface of the transparent electrode 242 has an area smaller than an area of the transparent electrode 242.

A region of the transparent electrode 242 occupied by the reflective electrode 244 is defined as a first region (shown in FIG. 14 as hatching lines), and a region of the transparent electrode 242, which is not covered by the reflective electrode 244, is defined as a second region as shown in FIG. 14. One edge 242*c* of the transparent electrode 242 is exposed through a part of the second region. Accordingly, the first region has a U-shape and the reflective electrode 244 also has a U-shape.

Reference numeral 244*d* represents a third boundary disposed between the first and second regions of the transparent electrode 242. The third boundary 244*d* has the U-shaped configuration.

The orientation film 250 is formed on a part of the organic insulation layer 230, which is not covered by the pixel electrode 240, and on the upper surface of the pixel electrode 240.

The orientation film 250 prevents the liquid crystal 300 from being randomly aligned on the upper surface of the pixel electrode 240. The liquid crystal 300 is aligned in a predetermined pattern by the orientation film 250. To this end, the orientation groove 252 is formed in the orientation film 250.

Since the orientation film 250 has a thin thickness, it has the profile same to profiles of the transparent electrode 242 and the reflective electrode 244. Accordingly, the profile of the orientation film 250 varies at the third boundary 244*d* disposed between the transparent electrode 242 and the reflective electrode 244.

The orientation film 250 having the profile varied corresponding to the profiles of the transparent electrode 242 and the reflective electrode 244 is formed with the orientation groove 252, which is regularly aligned through a rubbing process.

In order to form the orientation groove 252, the rubbing fabric 255 having the piles 254 (in FIG. 9) rotates and moves forwards while making contact with the orientation film 250. The rubbing direction of the orientation groove 252 is very important. If the orientation groove 252 is improperly oriented, the ions and impurities attached to the rubbing fabric 255 remain in the third boundary 244*d* between the transparent electrode 242 and the reflective electrode 244.

Due to the ions and impurities remained in the third boundary 244*d*, a response speed of the liquid crystal 300 is lowered as compared with a required response speed of the liquid crystal 300. If the response speed of the liquid crystal 300 is lower than the required response speed, an afterimage is generated, thereby affecting a bad influence on image information to be displayed.

According to the present embodiment, in order to prevent the afterimage caused by a rubbing direction, the piles 254 of the rubbing fabric 255 (in FIG. 9) firstly rub the first region of the transparent electrode 242 and sequentially rub the second region of the transparent electrode 242, which is exposed without being covered by the reflective electrode 244, as shown in FIG. 14.

Since the transparent electrode 242 is sequentially rubbed after the reflective electrode 244 has been rubbed, the afterimage generated at the third boundary 244*d* caused by the ions and impurities remained in the third boundary 244*d* may be reduced.

The rubbing direction of the orientation groove 252 for preventing the afterimage from being generated at the third boundary 244*d* disposed between the reflective electrode 244 and the transparent electrode 242 may be variously selected.

Referring to FIG. 14, the rubbing direction is formed from the 6 o'clock direction to the 12 o'clock direction to prevent the afterimage from being generated at the third boundary 244*d* disposed between the reflective electrode 244 and the transparent electrode 242.

If the rubbing process is carried out from the 3 o'clock direction to the 9 o'clock direction, from the 9 o'clock direction to the 3 o'clock direction, or from the 12 o'clock direction to the 6 o'clock direction, the rubbing direction faces the third boundary 244*d* disposed between the reflective electrode 244 and the transparent electrode 242, so that ions and impurities may be stacked at the third boundary 244*d*.

FIG. 15 is a plan view showing a rubbing direction of an orientation groove disposed on a pixel electrode of FIG. 11, according to another embodiment of the present invention. FIG. 15 also shows a method for varying the rubbing characteristic of the orientation groove by changing a shape of the reflective electrode of the pixel electrode of FIG. 11.

Referring to FIG. 15, the slope surface 244*b* is formed at the sidewall of the reflective electrode 244 corresponding to the third boundary 244*d* between the first and second regions of the transparent electrode 242, in order to prevent ions and impurities from remaining in the third boundary 244*d*. That is, the ions and impurities scattered when performing the rubbing process may be prevented from being stacked at the third boundary 244*d* by forming the slope surface 244*b* at the sidewall of the reflective electrode 244.

Figure 16:
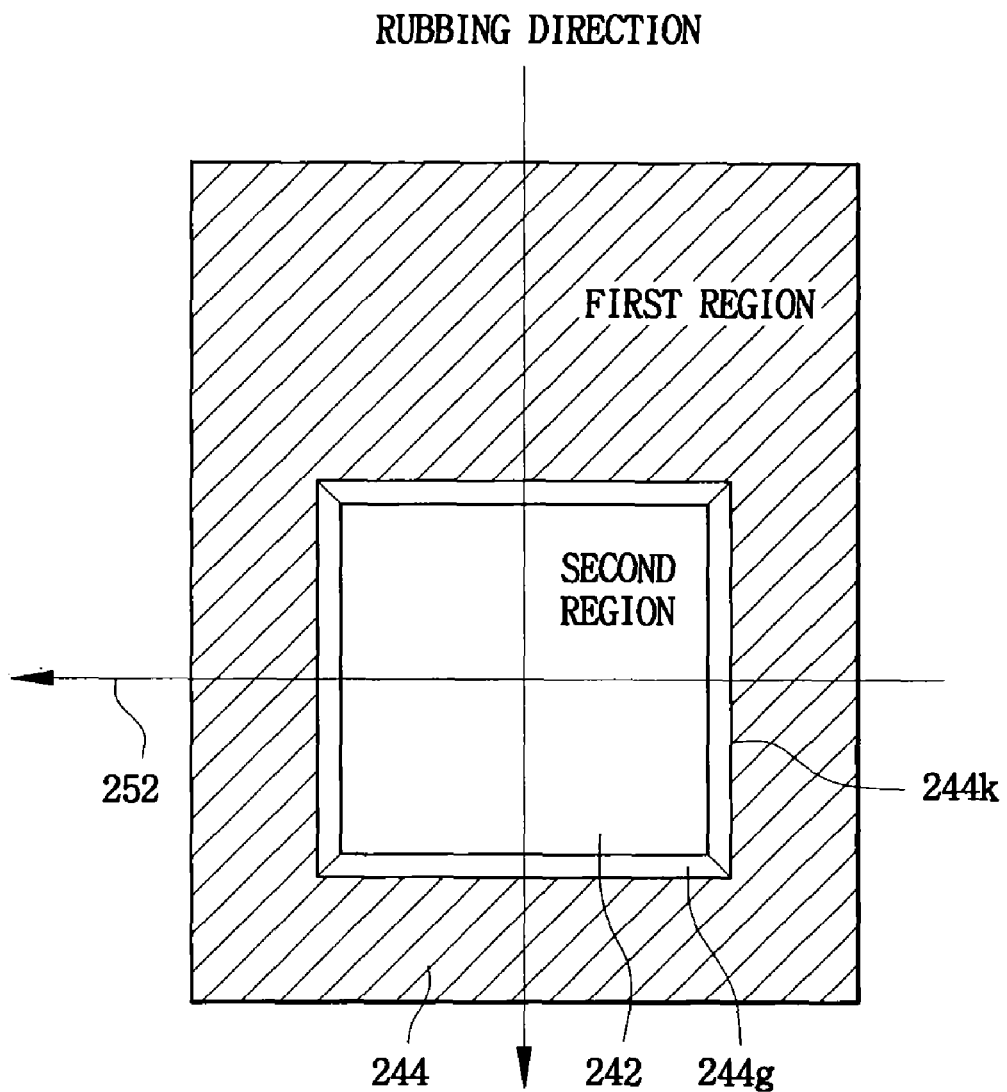
FIG. 16 is a plan view showing a pixel electrode according to further embodiment of the present invention.

FIG. 16 is a plan view showing a rubbing direction of an orientation groove disposed on a pixel electrode, according to further embodiment of the present invention. FIG. 16 also provides a method for varying the rubbing characteristic of the orientation groove by changing a shape of the reflective electrode of the pixel electrode.

Referring to FIG. 16, a region of the transparent electrode 242 occupied by the reflective electrode 244 is defined as a first region, and a region of the transparent electrode 242, which is not covered by the reflective electrode 244, is defined as a second region.

As shown in FIG. 16, the second region is formed in the first region. The second region does not expose an edge of the transparent electrode 242.

When forming the second region in the first region, impurities or ions are stacked at a fourth boundary 244*k* between the first and second regions regardless of the rubbing direction, thereby generating the afterimage.

In order to prevent impurities or ions from being stacked at the fourth boundary 244*k* between the reflective electrode 244 and the transparent electrode 242, a slope portion 244*g* is formed at the reflective electrode 244 adjacent to the fourth boundary 244*k*.

The slope portion 244*g* may be formed in opposition to the rubbing direction or may be formed over the entire area of the fourth boundary 244*k* as shown in FIG. 16.

The shape of the slope portion 244*g* may be variously selected as long as the ions and impurities introduced into the fourth boundary 244*k* of the reflective electrode 244 and the transparent electrode 242 is discharged to an exterior through the slope portion 244*g*.

Although not shown in FIG. 16, the transparent electrode 242 may include more than one the second region. In this case, the second region may include a circular shape or a rectangular shape.

Referring again to FIG. 5, the color filter substrate 400 is coupled to the TFT substrate 200 after the orientation groove 252 has been formed on the TFT substrate 200.

The color filter substrate 400 includes a second transparent substrate 410, a color filter 420, and a common electrode 430. The color filter 420 is formed on the second transparent substrate 410 in opposition to the pixel electrode 240 disposed on the TFT substrate 200.

The color filter 420 includes a first tone at a region corresponding to a reflective electrode (see FIG. 8) and a second tone at a region of a transparent electrode (see FIG. 8) being exposed without being covered by the reflective electrode, which is different from the first tone.

The common electrode 430 is formed on an entire surface of the color filter 420 such that the color filter 420 covers the second transparent substrate 410.

The liquid crystal 300 is interposed between the color filter substrate 400 and the TFT substrate 200, thereby achieving the reflective-transmissive type liquid crystal display device 500 according to the present invention.

As described above, the reflective-transmissive type liquid crystal display device of the present invention may reduce the afterimage affecting a bad influence on an image to be displayed by varying the rubbing direction of the orientation groove and the shape of the reflective electrode, thereby achieving superior quality of display.

While the present invention has been described in detail with reference to the preferred embodiment thereof, it should be understood to those skilled in the art that various changes, substitutions and alterations can be made hereto without departing from the scope of the invention as defined by the appended claims.

What is claimed is:

1. A reflective-transmissive type liquid crystal display device, comprising:
    a first substrate, including:
        a thin film transistor disposed on a first transparent substrate;
        an organic insulation layer disposed on the first transparent substrate to insulate the thin film transistor, the organic insulation layer having a contact hole for exposing an output terminal of the thin film transistor;
        a pixel electrode including a transparent electrode connected to the output terminal of the thin film transistor through the contact hole disposed on the organic insulation layer, and a reflective electrode disposed on the transparent electrode, having an area less than the transparent electrode and defining a first region of the transparent electrode, a portion of the transparent electrode being exposed without being covered by the reflective electrode defining a second region, the second region of the transparent electrode including a first boundary and a second boundary, wherein the first boundary is a boundary between the first and second regions and the second boundary is an exposed edge of the transparent electrode; and
        an orientation film coated on an upper surface of the pixel electrode and having an orientation groove rubbed in a first direction from the first boundary toward the second boundary, the orientation groove preventing impurity from being stacked at the first boundary of the transparent electrode;

a second substrate, including:
    a color filter disposed on a second transparent substrate in opposition to the pixel electrode; and
    a common electrode disposed on an upper surface of the color filter and facing the pixel electrode; and
a liquid crystal interposed between the first and second substrates.

2. The reflective-transmissive type liquid crystal display device as claimed in claim 1, wherein the first boundary includes at least two straight lines in a layout of the pixel electrode.

3. The reflective-transmissive type liquid crystal display device as claimed in claim 2, wherein the first direction is parallel to one of the straight lines.

4. The reflective-transmissive type liquid crystal display device as claimed in claim 2, wherein the reflective electrode includes a sidewall making contact with the first boundary, and the sidewall is inclined to prevent the impurity from being stacked at the first boundary.

5. The reflective-transmissive type liquid crystal display device as claimed in claim 1, wherein the second region exposes two edges of the first region of the transparent electrode, and the two edges are connected to each other.

6. The reflective-transmissive type liquid crystal display device as claimed in claim 5, wherein the reflective electrode includes a sidewall making contact with the first boundary, and the sidewall is inclined to prevent the impurity from being stacked at the first boundary.

7. The reflective-transmissive type liquid crystal display device as claimed in claim 5, wherein the first boundary and the first region each have an L-shaped configuration.

8. The reflective-transmissive type liquid crystal display device as claimed in claim 1, wherein the second region partially exposes one edge of the transparent electrode.

9. The reflective-transmissive type liquid crystal display device as claimed in claim 8, wherein the reflective electrode includes a sidewall making contact with the boundary of the first and second regions, and the sidewall is inclined to prevent the impurity from being stacked at the boundary.

10. The reflective-transmissive type liquid crystal display device as claimed in claim 8, wherein the boundary between the first and second regions, and the first region each include a U-shaped configuration.

11. The reflective-transmissive type liquid crystal display device as claimed in claim 1, wherein the second region is formed on an inside of the first region, and wherein the reflective electrode includes a sidewall adjacent to the boundary of the first and second regions, the sidewall being inclined to prevent the impurity from being stacked at the boundary.

12. The reflective-transmissive type liquid crystal display device as claimed in claim 11, wherein the transparent electrode includes a plurality of the second regions, and wherein the second regions include a circular shape or a rectangular shape.

13. The reflective-transmissive type liquid crystal display device as claimed in claim 11, wherein the color filter comprises a first tone at the first region corresponding to the reflective electrode and a second tone at the second region of the transparent electrode being exposed without being covered by the reflective electrode, which is different from the first tone.

14. A method for fabricating a reflective-transmissive type liquid crystal display device, the method comprising:
    forming a thin film transistor on a first transparent substrate;
    depositing an organic insulation layer on the first transparent substrate to insulate the thin film transistor, the organic insulation layer having a contact hole for exposing an output terminal of the thin film transistor;
    forming a pixel electrode on the organic insulation layer, the pixel electrode including a transparent electrode connected to the output terminal of the thin film transistor through the contact hole and a reflective electrode formed on the transparent electrode, having an area less than the transparent electrode and defining a first region of the transparent electrode, a portion of the transparent electrode being exposed without covering by the reflective electrode defining a second region, the second region of the transparent electrode including a first boundary and a second boundary wherein the first boundary is a boundary between the first and second regions and the second boundary is an exposed edge of the transparent electrode;
    coating an orientation film on an upper surface of the pixel electrode;
    rubbing the orientation film in a first direction from the first boundary toward the second boundary to form an orientation groove on the orientation film, rubbing the orientation film in the first direction preventing impurity from being stacked at the first boundary of the transparent electrode;
    forming a color filter on a second transparent substrate in opposition to the pixel electrode;
    forming a common electrode on an upper surface of the color filter, the common electrode facing the pixel electrode; and
    interposing a liquid crystal between the common electrode and the pixel electrode on which the orientation film and the orientation groove are formed.

15. The method as claimed in claim 14, wherein forming a pixel electrode comprises:
    forming the transparent electrode on the first transparent substrate on which the thin film transistor and the organic insulation layer are formed;
    forming a metal thin film on an upper surface of the transparent electrode; and
    patterning the metal thin film such that the reflective electrode is formed on the first region of the transparent electrode and the first boundary has a linear shape in a layout of the pixel electrode.

16. The method as claimed in claim 15, wherein patterning the metal thin film includes forming a sidewall of the reflective electrode at the first region adjacent to the first boundary, the sidewall slanting to prevent the impurity from being stacked at the sidewall of the reflective electrode.

17. The method as claimed in claim 14, wherein forming a pixel electrode comprises:
    forming the transparent electrode on the first transparent substrate on which the thin film transistor and the organic insulation layer are formed;
    forming a metal thin film on an upper surface of the transparent electrode; and
    patterning the metal thin film such that the reflective electrode is formed on the first region of the transparent electrode and the second region exposes two edges of the transparent electrode, the two edges being connected to each other.

18. The method as claimed in claim 17, wherein patterning the metal thin film includes forming a sidewall of the reflective electrode at the first region adjacent to the first boundary, the sidewall slanting so as to prevent the impurity from being stacked at the sidewall of the reflective electrode.

19. The method as claimed in claim 14, wherein forming a pixel electrode comprises:
   forming the transparent electrode on the first transparent substrate on which the thin film transistor and the organic insulation layer are formed;
   forming a metal thin film on an upper surface of the transparent electrode; and
   patterning the metal thin film such that the reflective electrode is formed on the first region of the transparent electrode and the second region exposes one edge of the transparent electrode.

20. The method as claimed in claim 19, wherein patterning the metal thin film includes forming a sidewall of the reflective electrode at the first region adjacent to the boundary, the sidewall slanting so as to prevent the impurity from being stacked at the sidewall of the reflective electrode.

21. The method as claimed in claim 14, wherein forming a pixel electrode comprises:
   forming the transparent electrode on the first transparent substrate such that the second region is formed on an inside of the first region;
   forming a metal thin film on an upper surface of the transparent electrode; and
   patterning the metal thin film such that the reflective electrode is formed on the first region of the transparent electrode, and a sidewall of the reflective electrode is slantingly formed at the first region adjacent to the boundary so as to prevent the impurity from being stacked at the sidewall of the reflective electrode.

22. The method as claimed in claim 21, wherein the transparent electrode includes a plurality of the second regions.

23. The method as claimed in claim 21, wherein the second regions include a circular shape or a rectangular shape.

* * * * *